E. B. FLOWERS & J. S. FRIDDLE.
PICKER STICK CHECK FOR LOOMS.
APPLICATION FILED FEB. 19, 1918.

1,279,314.

Patented Sept. 17, 1918.
3 SHEETS—SHEET 1.

Witness:
P. J. Gathmann

Inventors
E. B. Flowers and
J. S. Friddle,
By Baldwin & Wight
their Attorneys

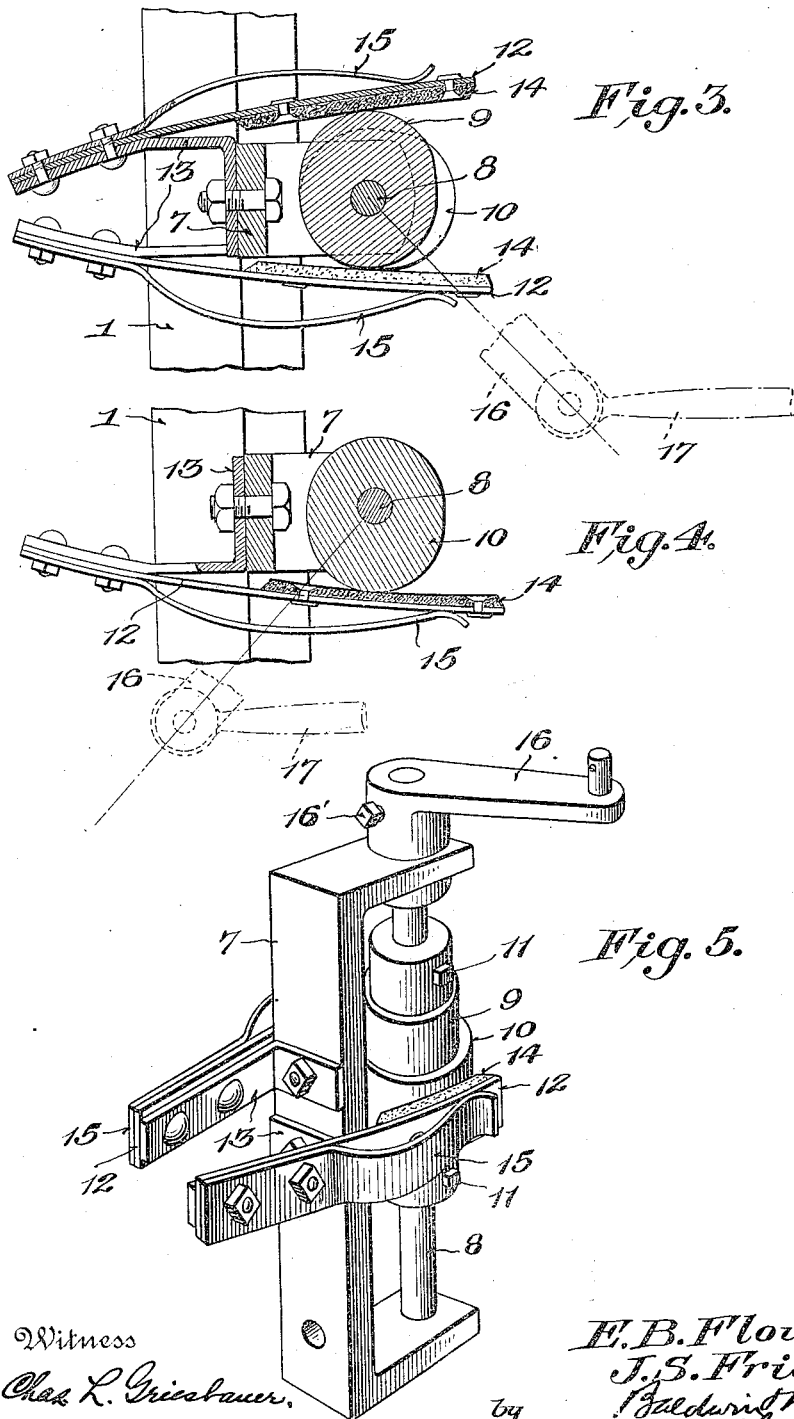

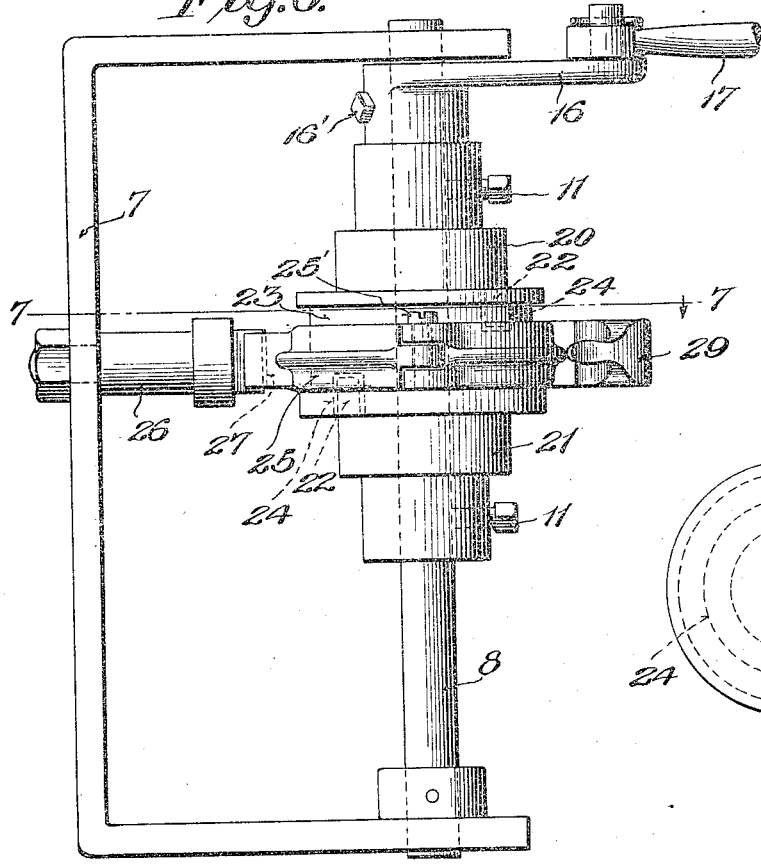
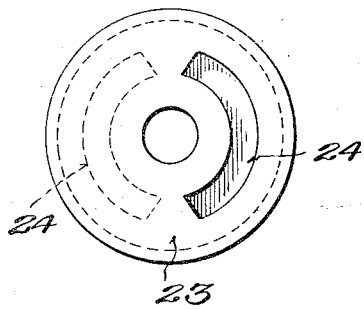
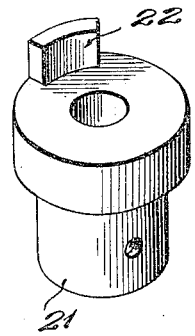
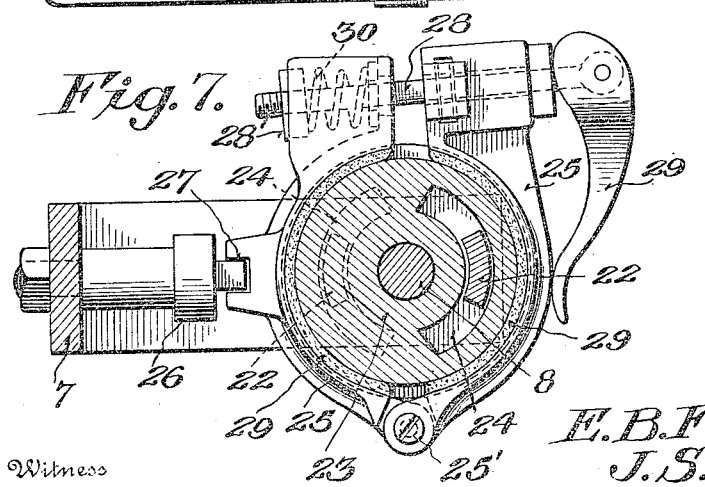

UNITED STATES PATENT OFFICE.

EDWARD B. FLOWERS AND JAMES S. FRIDDLE, OF COLUMBIA, SOUTH CAROLINA.

PICKER-STICK CHECK FOR LOOMS.

1,279,314.  Specification of Letters Patent.  Patented Sept. 17, 1918.

Application filed February 19, 1918.  Serial No. 218,104.

*To all whom it may concern:*

Be it known that we, EDWARD B. FLOWERS and JAMES S. FRIDDLE, both citizens of the United States, residing at Columbia, in the county of Richland and State of South Carolina, have invented certain new and useful Improvements in Picker-Stick Checks for Looms, of which the following is a specification.

This invention relates to an improved device for checking the motion of picker-sticks on looms, and has for its object to provide a simple device for this purpose which may be used for effectively checking the movement of the picker-stick both on the forward and backward limits of its throw, but which will not impede the necessary quick stroke of the stick between the two extremities. By the use of our device the picker-stick is not checked in its movement with a jerk or with such abruptness as to cause undue wear on the machine or to possibly break the picker-stick, but the checking action is yielding and gradual.

In accordance with our invention, a suitable checking device, which may be in the form of a cam is rotated through a suitable connection with the picker-stick and a brake engaging the cam serves to check the rotation of the cam when the cam is moved to breaking position. We prefer to provide one cam for checking the forward movement of the picker-stick and a second cam for checking it on its return.

In the accompanying drawings, which show a preferred embodiment of our invention, Figure 1 represents a plan view of a portion of a loom and picker-stick provided with our attachment, the picker-stick being shown in section and at the limit of its forward position.

Fig. 3 is a section, showing the position of the cam for limiting the forward motion of the picker-stick.

Fig. 4 is a section of the cam for limiting the backward motion of the picker-stick.

Fig. 5 is a perspective view of the check mechanism detached from the loom.

Fig. 6 is a side elevation of a modified form of our invention.

Fig. 7 is a section on line 7—7 of Fig. 6.

Fig. 8 is a plan view of a portion of the checking device.

Fig. 9 is a perspective view of another portion of the checking device.

Figure 1:
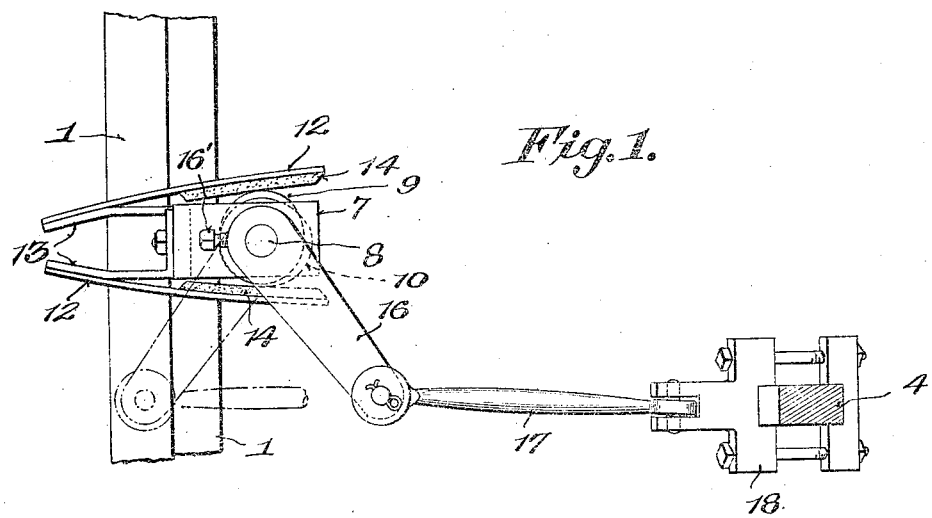
Figure 2:
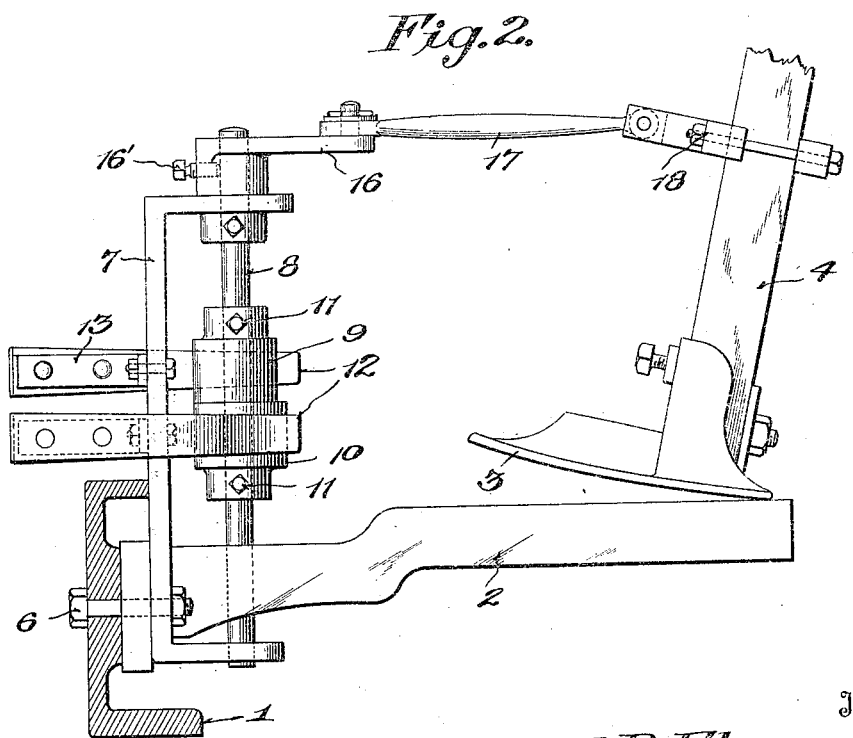
Fig. 2 is a side elevation of Fig. 1.

Referring more particularly to Figs. 1, 2, 3, 4, and 5 of the drawings, which show one form of our invention, 1 represents the frame of any loom of well known construction provided with a rocker-shaft support 2, on which is a rocker 3 carrying the picker-stick 4. The picker-stick is rocked or oscillated by means of mechanism well-known in the art and not herein shown.

Our improved check mechanism is secured to the frame of the loom 1 by any suitable means as a bolt 6, and it comprises a frame 7 in which is rotatably supported a shaft 8 provided with suitable checking devices, such as cams 9 and 10 mounted thereon. These cams are preferably provided with a comparatively abrupt eccentric portion, and may be adjustably secured to the shaft 8 by means of clamp bolts 11, whereby the cams may be properly mounted on the shaft 8 with relation to the picker-stick. Bolted or otherwise secured to the frame 7 of the device, as by angular supports 13 are brakes 12, which may be formed of spring metal and which may be provided with a leather or fabric lining 14. As preferably constructed, however, (as shown in Figs. 3, 4 and 5) the brakes are formed of metal strips provided with a lining 14 and have steel springs 15 by means of which they are yieldingly held in proper relation with the cams. These brakes are so positioned that each one bears against one of the cams 9 and 10. The brakes have no operative contact with the cams except when the shaft 8 is rotated to bring the eccentric portion of one of the cams to the position where it forces the brake to yield, when the friction between the brake and the cam exerts a checking action, thereby preventing further rotation of the cam.

The rotating shaft 8 is furthermore provided with a crank 16 which is connected with the picker-stick 4 through a suitable link 17 having pivotal connection therewith. The crank 16 may also be adjusted with relation to the shaft 8 by means of the clamp bolt 16′. The link 17 is secured to the picker-stick by means of a clamp 18. It will thus be seen that upon the rocking of the picker-stick the crank 16 may be made to rotate through a complete circle or to oscillate through a limited arc, thereby either completely or only partially rotating the cams (as indicated by dotted lines in Figs. 1, 3 and 4).

In operation, the clamp 18 is adjusted vertically on the picker-stick to suit the throw of the picker-stick, and to preferably oscillate the crank 16 through an arc of less than 180 degrees. The cams 9 and 10 are then so adjusted on the shaft 8 and locked in position by bolts 11, as to bring the highest portion of cam 9, for instance, beneath one of the brakes 12 when the picker-stick is farthest forward, and of the cam 10 when the picker-stick is farthest back, as shown in Figs. 3 and 4, respectively. Upon a rocking motion being imparted to the picker-stick the cam 9 will be moved to check the picker-stick at the forward limit through frictional engagement with the brake 12, and the cam 10 will check the picker-stick at the backward limit in a similar manner. By forming the eccentric portions of the cam comparatively abruptly, the checking action, while sufficiently gradual, does not begin until near the end of the stroke of the picker-stick, and the picker-stick is not impeded in its motion between the forward and backward limits.

In Figs. 6, 7, 8 and 9, in which we have shown a modified form of the invention, we provide a frame 7 and a shaft 8 having a crank 16 secured thereon by means of a set screw 16' of the same construction as that described with regard to the other form of our invention. Instead, however, of employing eccentric cams as checking devices we use collars 20 and 21 secured to the shaft 8 by means of set screws 11, each of the collars being provided on their opposing faces with a projecting lug 22 (see Fig. 9). Disposed between the two faces of the collars is a brake drum 23 having grooves 24 cut in its opposite faces, and in which the lugs 22 are adapted to project. This brake drum 23 is rotatable independently of the shaft 8, being rotated only by the engagement of one of the lugs 22 with the ends of the grooves 24. To check the rotation of the drum 23 is a brake band 25, connected with the frame 7 by means of a support 26, which encircles the periphery of the drum 23 and has frictional engagement therewith. To permit of vertical adjustment, the brake band 25 is preferably provided with a groove 27 with which the outer portion of the support 26 has a sliding engagement. In order that the drum 23 may be yieldingly held against rotation by the action of the brake band to gradually check the rotation of the shaft 8 through lugs 22 when one of the lugs is in operative engagement with the drum 23, the brake band is preferably made adjustable whereby the checking action may be properly regulated. This is accomplished by forming the brake band 25 in two sections having two ends pivoted together at 25' and having the opposite ends connected by means of a bolt 28 having a nut 28' on one end and a lever 29 on the opposite end. The lever 29 is provided with an eccentric portion bearing against the brake band 25 whereby the brake band may be quickly expanded by moving the lever. A spring 30 serves to yieldingly hold the brake band expanded to the limit permitted by the nut 28'. The brake band is also preferably provided with a leather or fabric lining 29.

The operation of the modified construction is similar to that of the other form of our invention, one collar 20 serving to check the forward motion of the picker-stick and the second lug 21 serving to check the backward movement thereof, while the grooves 24 permit of a free movement of the lugs until the picker-stick reaches the limit of its throw when the lug 22 is brought into engagement with the drum 23. The friction of the brake band 25 against the drum 23 serves to yieldingly check further motion thereof.

It will be noted that by making both the checking devices 9 and 10, 20 and 21 adjustable, and the clamp on the picker-stick adjustable, an accurate relation between the checking devices and the throw of the picker-stick may be obtained, whereby our invention may be made applicable to different looms wherein the throw or amplitude of movement of the picker-stick varies.

It will be understood that a similar check is employed for the picker-stick on each end of the loom.

We claim as our invention:—

1. The combination of a picker-stick, a check member positively connected with the picker-stick and movable thereby coincidently therewith, and a check member co-acting with the first mentioned member to apply a checking action thereto which is effective only as the picker-stick approaches the limit of its throws.

2. The combination of a picker-stick, a rotary check member positively connected with the picker-stick and movable thereby coincidently therewith, and a check member co-acting with the first mentioned member to check its movement only when the picker-stick approaches the limits of its throws.

3. The combination of a picker-stick, a rotary shaft, a positive connection between the picker-stick and the shaft, whereby the latter is moved coincidently with the former, a check member adjustably secured to said shaft, and another check member co-acting with the first mentioned member to check its movement only when the pickerstick approaches the limits of its throws.

4. The combination of a picker-stick, a check member positively connected with the picker-stick and movable thereby coincidently therewith, a check member having coaction with the first mentioned member only when the picker-stick approaches the limit of its throw in one direction, and another checking device for the picker-stick similar to that first mentioned for checking the movement of the picker-stick when moved in the opposite direction.

5. A picker-stick check, comprising a shaft, means for rotating said shaft relatively to the motion of the picker-stick, collars on said shaft having lugs disposed on their opposing faces, a brake drum having slots therein for engagement with said lugs disposed between the collars, and means for yieldingly holding said brake drum from rotation.

6. A picker-stick check, comprising a shaft, means for rotating said shaft relatively to the motion of the picker-stick, collars on said shaft having lugs disposed on their opposing faces, a brake drum having slots therein for engagement with said lugs disposed between the collars and adjustable means for yieldingly holding said brake drum from rotation.

7. A picker-stick check for looms, comprising a rotatable checking device, means for rotating the checking device relatively to the picker-stick, means out of contact with said checking device during the effective portion of the throw of the picker-stick for yieldingly engaging said checking device near the limits of the throw of the picker-stick.

8. The combination of an oscillating picker-stick, a check member positively connected with the picker-stick and movable thereby coincidently therewith, and a check member having checking coaction with the first mentioned member only when the picker-stick approaches the limits of its throws.

In testimony whereof we have hereunto subscribed our names.

EDWARD B. FLOWERS.
JAMES S. FRIDDLE.

Copies of this patent may be obtained for five cents each, by addressing the "Commissioner of Patents, Washington, D. C."